United States Patent [19]
Larson et al.

[11] Patent Number: 5,793,386
[45] Date of Patent: Aug. 11, 1998

[54] REGISTER SET REORDERING FOR A GRAPHICS PROCESSOR BASED UPON THE TYPE OF PRIMITIVE TO BE RENDERED

[75] Inventors: Michael Kerry Larson; Patrick A. Harkin, both of Austin, Tex.

[73] Assignee: S3 Incorporated, Santa Clara, Calif.

[21] Appl. No.: 672,620

[22] Filed: Jun. 28, 1996

[51] Int. Cl.$^6$ .................................................. G06F 15/00
[52] U.S. Cl. ...................... 345/522; 345/513; 345/501
[58] Field of Search ........................ 345/422, 429–433, 345/435, 501, 522, 507, 509, 512, 513, 515

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,299,309 | 3/1994 | Kuo et al. | 345/512 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,649,173 | 7/1997 | Lentz | 345/513 |

FOREIGN PATENT DOCUMENTS

WO 96/36011  11/1996  WIPO ................... G06T 3/00

Primary Examiner—Kee M. Tung
Attorney, Agent, or Firm—Fenwick & West LLP

[57] ABSTRACT

A graphics system includes a graphics controller for rendering polygons with a minimum number of steps and registers. A host processor generates a display list that includes only the values necessary for rendering a primitive. The graphics controller includes a register file for receiving the display list either directly from the host processor or from system memory in which the host processor stored the display list. The graphics controller also includes logic to decode operational codes to ascertain which values from the register file must be used for rendering a primitive and which values can be skipped. Only the necessary values are transmitted to polygon and texture engines also included within the graphics processor.

19 Claims, 3 Drawing Sheets

REGISTER SET REORDERING FOR A GRAPHICS PROCESSOR BASED UPON THE TYPE OF PRIMITIVE TO BE RENDERED

FIELD OF THE INVENTION

The present invention relates generally to a graphics control system for a personal computer. More particularly, the present invention relates to a method and apparatus for minimizing the number of parameters that must be stored and processed for a particular graphics operation. Still more particularly, the present invention relates to a technique for eliminating consideration of certain registers by instruction reordering, based upon the particular type of primitive to be rendered by the graphics system.

BACKGROUND OF THE INVENTION

Before the availability of the personal computer (PC), computer graphics packages were expensive tools reserved for industry. Early microcomputers typically had a low screen resolution (256×256, for example) which were only capable of rendering simple line drawings. As microcomputers evolved, color displays became common, and programmers began to routinely provide data output in a graphical manner. The graphics techniques used were unstructured, with objects defined in terms of absolute coordinates using straight lines. Subsequently, graphics "primitives" were used to enable circles, ellipses, rectangles and polygons to be drawn with a single instruction. In addition, color displays typically were defined by intensity values of three primary colors, which when blended, gave a high quality color display.

The availability of computer graphics has generated a demand for higher resolutions and three dimensional (3-D) rendering capabilities. Computer animation and games, in particular, have spawned a revolution in computer graphics capabilities. A 3-D image can be represented in a computer system as a collection of graphical objects, such as polygons, lines, and points. Each polygon may be defined as a set of vertex points. Associated with each point are certain pixel values, such as shading, texture, color, and the like. Identification of other points within the polygon typically is done through the use of linear interpolation. Once interpolated, the polygon can be rendered on a computer monitor by successive scanning of orthogonal rows of the polygon.

Performing the linear interpolation calculations for each point (or pixel) of a graphical primitive such as a polygon is very processor intensive. Initial and end values are interpolated by a graphics processor to obtain by interpolation pixel values for rendering the image. Consequently, less system memory is needed to store computer images with less traffic on the system bus to communicate video data to the graphics controller. Although advantageous over original graphics systems that store and communicate graphics values for every pixel, these latter slope technique based prior art systems still must store and process considerable data.

The pixel parameters are supplied to the graphics system in the form of a display list, which defines the parameters of the primitives to be rendered by the graphics processor. In addition, the display list "instructs" the graphics processor to draw polygons, lines, points and other graphical primitives, and further provides the starting and slope values for the various available parameters which are required for rendering a primitive.

Existing graphics implementations that use display lists typically load data in a sequential format to a register file in the graphics processor. For each type of primitive, a particular set of data values are required to render that type of primitive. For example, a point to be drawn to a pixel grid may require an x, y location, color values, and a z value for depth comparison. Conversely, if the primitive is a line, the parameters required may also include a slope to describe the line's direction in the x direction, and a count value to define the length in the y direction. Polygons require even more parameters to define their shape.

An example of a display list is shown below in Table I:

TABLE I

| DISPLAY LIST OFFSET | NAME | DESCRIPTION |
| --- | --- | --- |
| +0 | X | Initial X value |
| +4 | Y | Initial Y value |
| +8 | R | Initial Red value |
| +C | G | Initial Green value |
| +10 | B | Initial Blue value |
| +14 | Δ MAIN | Main Slope value |
| +18 | Y COUNT | Top count: Bottom count concatenated |
| +1C | WIDTH MAIN | Initial top width value |
| +20 | WIDTH OPP | Initial bottom width value |
| +24 | Δ WIDTH MAIN | Top width slope |
| +28 | Δ WIDTH OPP | Bottom width slope |
| +2C | Δ R MAIN | Red main Slope |
| +30 | Δ G MAIN | Green main Slope |
| +34 | Δ B MAIN | Blue main Slope |
| +38 | Δ R ORTHO | Red ortho Slope |
| +3C | Δ G ORTHO | Green ortho Slope |
| +40 | Δ B ORTHO | Blue ortho Slope |
| +44 | Z | Initial Z value |
| +48 | Δ Z MAIN | Z main slope value |
| +4C | Δ Z ORTHO | Z ortho value |
| +50 | V | Initial V value |
| +54 | U | Initial U value |
| +58 | Δ V MAIN | V main slope value |
| +5C | Δ U MAIN | U main slope value |
| +60 | Δ V ORTHO | V ortho slope value |
| +64 | Δ U ORTHO | U ortho sloper value |
| +68–+7C | Other texture values | |

The register file in Table I provides the parameters required to draw points, lines, and polygons. The display list provided from the central processor (or from memory) provides data for the various registers in the register file. Not all of these values, however, are necessary to draw points or lines. A display list including a subset of the values in Table I generally is used for drawing points and lines.

Furthermore, not all of the values available to define a primitive type are necessarily used to render a particular primitive. For example, green and blue values may not be desired for a given line. In prior art systems, if a primitive to be rendered does not require a particular parameter, then a null or zero value is loaded into the corresponding register in the register file. Thus, for example, if a flat shaded, Z buffered polygon is to be rendered (which does not require color shading information), null values would be loaded by the host processor into the display list corresponding to the unnecessary values, and then all of these values including the null values would subsequently be loaded into the register file.

The step of providing null values for unnecessary parameters increases the amount of memory required to store the parameters, increases the amount of time required to load the register file in the graphics processor, and also increases the volume of transactions on the system bus and the internal graphics processor bus during each stage of the rendering process. As a result, the rendering operation requires more memory space, and takes more time than it would if these unnecessary values were eliminated from consideration. It would be advantageous, therefore, if a graphics system were developed which could eliminate unnecessary parameters from consideration during register loading and rendering of the primitive. It would further be advantageous if the host processor could simply transmit necessary parameter values as part of the display list, and if the graphics system would recognize that these parameter values are the only necessary values, so as to eliminate the unnecessary loading of unused data. Despite the apparent advantages of a graphics system which eliminates consideration of unnecessary parameters, to date no one has developed or implemented such a system.

SUMMARY OF THE INVENTION

The present invention provides a technique and protocol for reordering the register sets comprising the register file based upon the type of primitive to be rendered. Thus, the present invention eliminates from consideration parameters that are not required to render the indicated primitive. As a result, the host processor only transmits necessary parameter values, and the graphics controller only loads and transfers the parameters necessary to render the particular primitive.

Primitive parameters are generated by a software driver in a system processor, and are provided to the graphics processor in the form of a display list. The software driver places into the display only the parameters necessary to render the indicated primitive. In the preferred embodiment, the graphics processor includes a prefetch unit that obtains the display list either directly from the system processor, or from system memory through a read operation. In addition, the prefetch unit preferably also retrieves instructions from the system memory in the form of operational codes (or "opcodes").

The graphics processor also preferably includes an internal instruction execution unit that receives the opcode from the prefetch unit and decodes the opcode. The execution unit also receives the display list and stores the display list in a register file. The execution unit, as part of its opcode decoding, determines the type of primitive that is to be rendered, and accordingly, causes only the necessary register values from the register file to be transmitted to polygon and texture engines for rendering the primitive.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
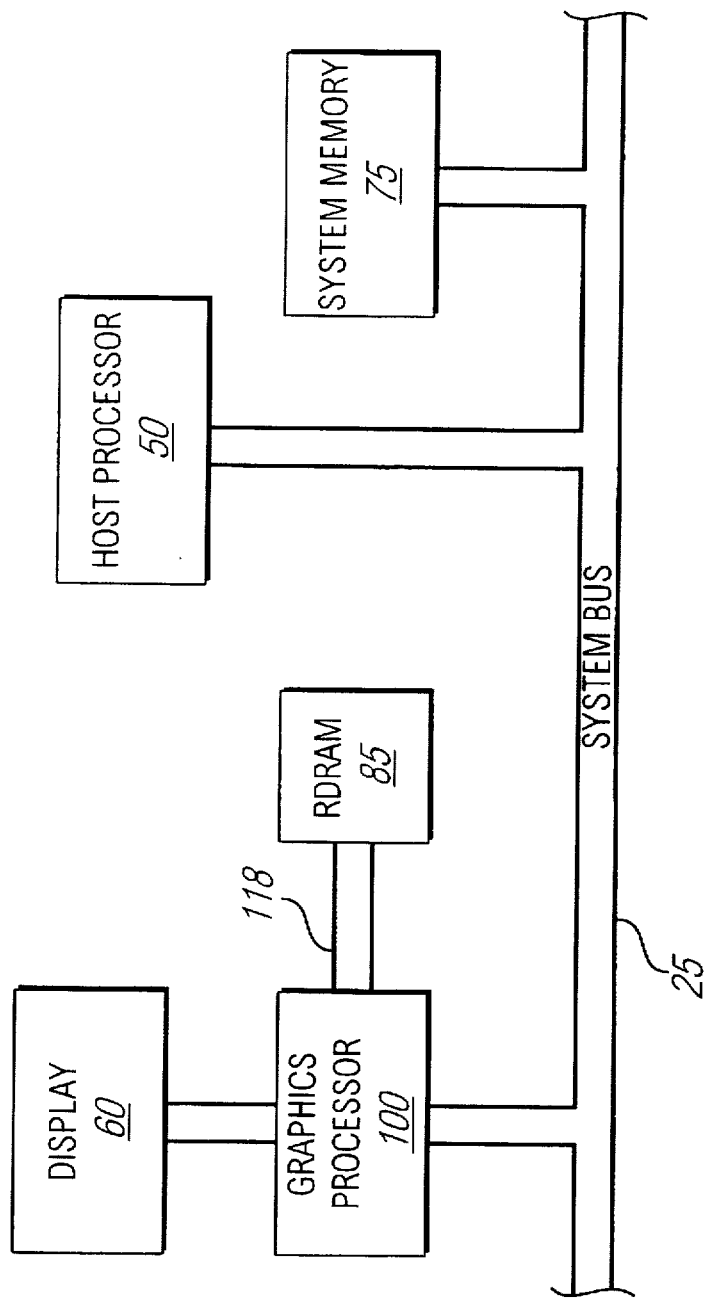
FIG. 1 is a simplified block diagram of a graphics processor connected to a system bus of a computer system, in accordance with the principles of the present invention.

Referring now to FIG. 1, the present invention relates generally to a graphics system for a personal computer (PC) capable of rendering points, lines and polygons using a main slope technique. As shown in FIG. 1, the graphics system generally includes a host processor 50 and system memory 75 coupled to a system bus 25, a graphics processor 100, a frame buffer, such as an RDRAM array 85, and a display unit 60. The host processor 50 may comprise the central processing unit of a PC, while system memory 75 may comprise the working memory, or random access memory array of the PC. The host processor 50 preferably includes a software driver for generating display parameters, which describe display objects to be rendered by the graphics processor 100. Thus, for example, the software driver may identify the spatial location of points, line endpoints, or vertex coordinates of polygons. For polygons, the software driver also preferably identifies main slope and width slope values for the polygon. When applicable, the software driver may identify color intensity, texture, and slope values, and various other parameter values as will be understood by one skilled in the art. Thus, the software driver calculates and loads main and orthogonal slopes, start and stop values for pixel position, intensity, depth and transparency of objects to be rendered by the graphics processor 100. The host processor or software driver also generates an operational code instruction which defines the type of primitive to be rendered. The software driver preferably is loaded into the system memory 75 from a permanent magnetic storage device, such as a hard drive or CD ROM drive device. Once loaded, the software driver is executed by the host processor 50.

It should be understood that the particular embodiment shown in FIG. 1 is only one of many possible implementations of a graphics system for use in a personal computer system. FIG. 1 is simplified for purposes of clarity so that many components and control signals are omitted which are not necessary to understand the present invention. In the preferred embodiment, the graphics processor 100 provides hardware support for 2D and 3D graphics, and for text and windowing operations of a computer system. The graphics processor 100 transfers digital data from the system memory 75 or host processor 50, and processes data for storage in the RDRAM 85 ultimately for display on the display device 60.

In accordance with the preferred embodiment, the host processor provides necessary parameter values in the form of a display list, which typically is stored in system memory 75 until required by the graphics processor 100. Alternatively, the host processor 50 may write the display list to the graphics processor 100 in accordance with known techniques. In either event, and according to the principles of the present invention, the host processor only includes parameters in the display list which are necessary for the primitive to be drawn. If a parameter value is not required for the primitive, then its corresponding entry in the display list is omitted. This should be compared with the prior art technique of loading null or zero values in the display list for unnecessary parameters. Once the display list is generated by the host processor 50, it preferably is stored in system memory 75 until required by graphics processor 100.

The host processor 50 and system memory 75 both preferably communicate with the graphics processor 100 via the system bus 25. The system bus 25 may comprise any one of a plurality of different types of host or input/output (I/O) buses, including the industry standard architecture (ISA), the extended ISA (EISA), the peripheral component interconnect (PCI), the video electronic standard association (VESA) local bus or any other standardized system bus of a computer system.

Referring still to FIG. 1, the graphics processor 100 preferably couples to the system bus 25. In accordance with the preferred embodiment, the graphics processor 100 preferably includes bus mastering capabilities, thus permitting graphics processor 100 to obtain mastership of the system bus 25. By obtaining mastership of the system bus, the graphics processor 100 can read the display list from system memory 75, instead of waiting until the host processor performs a write operation. This mode of operation is called the "processor mode." As shown in FIG. 1, graphics controller 100 also connects to a display unit 60 and a RDRAM 85. In the preferred embodiment, the RDRAM 85 comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 60. For full color display, either three passes are made or three parallel logic slices are implemented for the three primary colors to achieve 24 bit pixel values. The display unit 60 may be any suitable type of display device, such as a cathode ray tube (CRT) for desktop, workstation or server applications, a liquid crystal display (LCD), a thin film transistor (TFT) display, or any other suitable display device for a personal computer.

Figure 2:
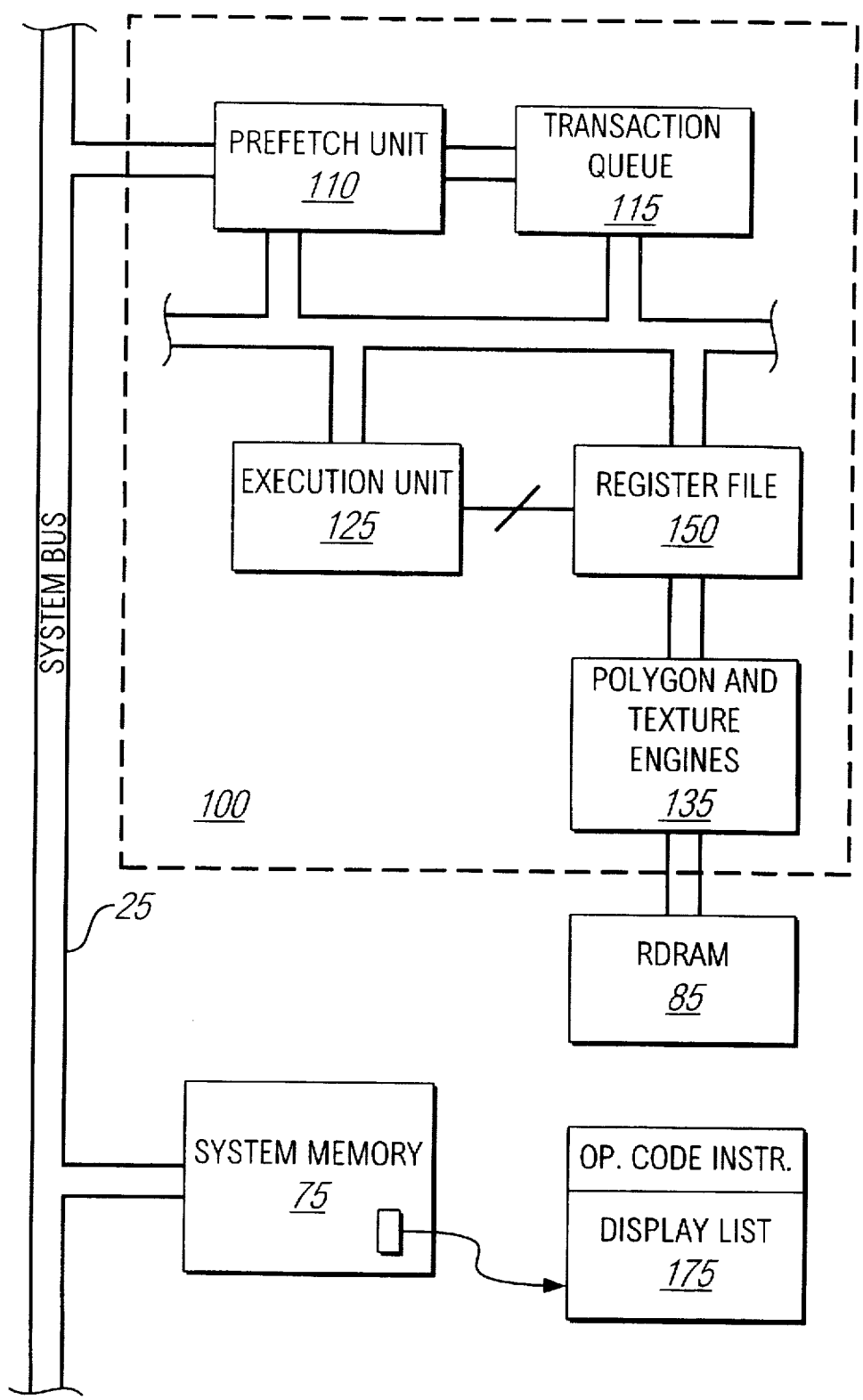
FIG. 2 is a block diagram showing in more detail a portion of the graphics processor of FIG. 1.

Referring now to FIG. 2, the graphics controller 100 preferably includes a prefetch unit 110 coupled to an execution unit 125, a register file 150, a transaction queue 115, and polygon and texture engines 135. The prefetch unit 110 provides an interface to the system bus 25. Generally, the prefetch unit 110 fetches instructions and the display list 175 and loads this information into the transaction queue 115 while the polygon and texture engines 135 are drawing previously fetched instructions. When the graphics processor is in a bus master mode (processor mode), the prefetch unit 110 generates the system bus address for reading the display list from system memory 75 and then preferably fills the transaction queue 115 with the display list instructions and display list. Internal to the prefetch unit 110 preferably is logic for generating control signals to arbitrate for control of the system bus 25. The particulars regarding the bus mastering control signals are immediately recognizable to one of ordinary skill in the art. During the processor mode of operation, the graphics processor 100 via the prefetch unit 110 can fetch and execute commands such as graphics drawing commands, register loads, frame synchronization commands, and commands to begin and end the processor mode of operation.

Under the direction of the prefetch unit 110 and execution unit 125, the contents of the transaction queue 115 are transferred to the register file 150 for subsequent rendering by the polygon and texture engines 135. As described above, the display list includes only the values necessary for rendering the primitive, whereas the register file 150 contains registers for every possible value to render any primitive. Therefore, to load the display list values into the appropriate registers in the register file, each value in the display list has an associated address corresponding to a register in the register file. The prefetch unit 110 and execution unit 125, therefore, stores each display list value in a register in the register file corresponding to the associated address for the value. Thus, one of ordinary skill will recognize, for example, from Table I that the AMAIN value in a display list will be stored in register 0x4014 in the register file. Unused values are not included in the display list and the corresponding registers in the register file 150 preferably are left unchanged from previous values.

The prefetch unit 110 may also generate internal module addresses during internal write cycles and decode other instructions such as a WAIT instruction. The WAIT instruction permits the display list execution and screen refresh events to be synchronized by suspending instruction prefetching until a screen event occurs. Thus, as will be apparent to one skilled in the art, the prefetch unit 110 preferably functions to ensure that data over-runs and data starvation do not occur during graphics operations.

Referring still to FIG. 2, the execution unit 125 generally functions to set the control states for the graphics processor 100, and further synchronizes operation of the graphics processor sub-components. In the preferred embodiment, the execution unit loads the register file from the transaction queue and then issues a poly request for poly commands. The execution unit 125 is placed in an IDLE mode between each and every draw or render instruction.

Once a set of display list values from the transaction queue 115 is loaded into the register file 150, the primitive defined by those values is rendered by the polygon and texture engines 135. While the polygon and texture engines are rendering the current primitive from the register file, the prefetch unit 110 may receive a display list corresponding to the next primitive to be rendered and, if so, loads the display list into the transaction queue 115.

The following discussion further describes operational code instructions and how display lists are constructed without unnecessary values. The system memory 75 in FIG. 2 is shown with an exploded view of the display list 175. The display list includes primitive values defining the object to be drawn by the graphics system. The display list typically is generated by the software driver which is executed by the host processor 50. As shown in the exploded view of the display list 175, the display list preferably includes an operational code instruction, together with drawing parameters. The operational code instruction preferably comprises a 32 bit double word and includes opcode, instruction modifier, A-field, and count fields as described in Table II below:

TABLE II

| | Operational Code Instruction. | | | |
|---|---|---|---|---|
| Bit value | 3 1 | 2 7 | 2 6 | 1 2 | 1 1 | 6 | 5 | 0 |
| Field name | Opcode | Instruction Modifier | | A-Field | Count |
| | Operation code to describe operation type. | Provides additional detail regarding operation type. | | Destination register load start. Used to load registers prior to starting engine execution. | Number of parameters to follow opcode information double word | tains registers for every possible value to render any primitive. Therefore, to load the display list values into the appropriate registers in the register file, each value in the Bits 27-31 of the operational code instruction comprise an opcode value which specifies the type of operation to be performed by the graphics processor, including the type of primitive to be rendered. Opcodes for some of the different types of operations are defined below in accordance with the preferred embodiment:

TABLE III

Opcodes.

| Opcode Name | Opcode Value (binary values) | Description |
|---|---|---|
| DRAW POINT | 00000 | Draw a point |
| DRAW LINE | 00001 | Draw a line |
| DRAW POLYGON | 00010 | Draw a polygon |
| WRITE 3D REGISTERS | 00011 | Write 3D register(s) |
| WRITE DEVICE REGISTERS | 00101 | Write internal device registers from memory location(s) |
| READ DEVICE REGISTERS | 00110 | Read internal device registers to memory location(s) |
| BRANCH | 01000 | Begins instruction processing at given address |

Consistent with the preferred embodiment, a particular opcode (00000) defines the rendering primitive as a point. Similarly, a different opcode value (00001) defines the primitive as a line, while another value (00010) defines a polygon. Other opcodes may be provided for writing internal device registers, reading internal device registers, beginning instruction processing at a given address, returning the graphics processor to the processor mode, clearing the polygon and texture engine registers, and writing data to control registers in the prefetch unit 110.

Bits 12–26 of the operational code instruction include the instruction modifier field which provides additional detail regarding the type of drawing operation to be performed. An exemplary instruction modifier field for the rendering commands (DRAW POINT, DRAW LINE, DRAW POLYGON) may include:

TABLE IV

Instruction Modifier.

| Instruction Modifier | Bit Field | Description |
|---|---|---|
| Expand Modifier | 25 | Next word contains additional modifiers. |
| Initial width | 24 | Set to 0 for DRAW POINT and DRAW LINE; initial triangle span width required for main and opposite sides for DRAW POLYGON |
| Fetch color | 23 | Destination color needed |
| Alpha load | 22 | Alpha registers are loaded |
| Dither | 21 | Dither object using pattern RAM |
| Pattern | 20 | Pattern object using pattern RAM |
| Stipple | 19 | Stipple object using pattern RAM |
| Lighting enable | 18 | Lighting processing enabled when set |
| Texture mode | 17–16 | 00: Texture mapping off<br>10: Linear texture mapping on<br>11: Perspective-corrected texture mapping on |
| Z on | 13 | Z depth function on when set |
| Gouraud | 12 | Interpolate colors across object when set (DRAW LINE and DRAW POLYGON); set to 0 for DRAW POINT |

As shown in the example in Table IV, bit 25 preferably comprises an expand modifier bit which signifies whether the word after the operational code instruction contains additional modifiers. The initial width bit 24 preferably specifies whether an initial triangle width value is provided in the display list. In the preferred embodiment, the fetch color bit 23 determines whether a destination color is needed. The alpha load bit 22 preferably signifies whether alpha registers are loaded. Similarly, the dither bit 21, pattern bit 20 and stipple bit 19 preferably specify whether the primitive is to be dithered, patterned and/or stippled, respectively. Preferably, the lighting processing is enabled through the lighting enable bit 18. The depth function preferably is selected with bit 13 and the Gouraud function for interpolating colors across an object is selected with bit 12. Finally, bits 16 and 17 are encoded to define the texture mapping mode if texture mapping is desired. If no texture mapping is needed, bits 16 and 17 are both set to 0. If linear texture mapping is desired, bits 16 and 17 are set to 0 and 1, respectively and if perspective-corrected texture mapping is desired, the bits are both set to 1.

The present invention advantageously generates display lists including only necessary information. That is, not all of the registers in Table I are used for each rendering operation type. The prior art discloses one display list format for each rendering operation type. For example, point rendering operations in the prior art used a display list including X, Y, R, G, B, Z, V, and U values. To render a particular point, however, only a subset of those values may be needed. In the past, data associated with the unused values still was included but was written with null values. In the present invention the host processor 50 includes only necessary, non-null values in the display list. Selection of the necessary values is based on the particular rendering command received, as exemplified in Tables V–VII below.

TABLE V(a)

POINT

| ADDRESS (1) | NAME (2) | Mapped Color (thru palette) (3) | Z Off (4) | Texture Mapping Off (5) |
|---|---|---|---|---|
| 0x4000 | X | | | |
| 0x4004 | Y | | | |
| 0x4008 | R | | | |
| 0x400C | G | SKIP | | |
| 0x4010 | B | SKIP | | |
| 0x4044 | Z | | SKIP | |
| 0x4050 | V | | | SKIP |
| 0x4054 | U | | | SKIP |

Table V(a) includes the eight values (X, Y, R, G, B, Z, V, and U) necessary for rendering points. Column 1 contains the corresponding addresses as defined in Table I. The third, fourth, and fifth columns indicate which of the values can be skipped or omitted from the display list for various conditions. The conditions in which values can be skipped are further described in Table V(b). If the graphics processor 100 is operating in a mapped or direct color mode, the G and B values can be skipped because those values are not used. Further, if the Z depth function is turned off through bit 13 in the Instruction Modifier field of Table IV, the Z value of the display list can be skipped. Finally, the V and U values can be skipped if texture mapping is turned off as indicated by the last column of Table V(a). As shown in Table IV, texture mapping can be turned off by writing a "0" to bits 16 and 17 in the Instruction Modifier field of the operational code instruction.

TABLE V(b)

POINT

| NAME | DESCRIPTION | PARAMETERS SKIPPED | SKIP PARAMETERS WHEN: |
|---|---|---|---|
| Mapped or direct color | Mapped color modes use a Color Lookup Table in the palette to determine displayed color (e.g., 8 bit, 256 color palette mode). Direct modes send portions of the pixel directly to the Digital to Analog converters for display | Green and blue | Device is in 8 bits per pixel mapped palette mode and only the red component of color is used. |
| Z | Z buffer functions on or off | Z values | Z depth function is turned off |
| Texture Mode | Determines whether linear or perspective texture mapping or neither is used | Various texture mapping parameters | Texture mapping is off |

Table V(b) defines the three modes in which values can be eliminated from a display list when rendering a point. As is known to those of ordinary skill in the art, the mapped or direct color modes use a color lookup table in a palette to determine displayed color. In the Z mode, the Z depth function is performed. Finally, texture mode determines whether linear or perspective texture mapping (or neither) is used to render primitives.

values can be skipped during these conditions. For the mapped color mode, not only are the G and B values skipped, but also the $\Delta$G MAIN and $\Delta$B MAIN values can be skipped. The Z and $\Delta$Z MAIN values are skipped in column 5 when the Z depth function is turned off. When the texture mapping mode is turned off in column 6, the V, U, $\Delta$V MAIN, $\Delta$U MAIN, $\Delta$2V MAIN, and $\Delta$2U MAIN values may be skipped. Further, if the Gouraud shading mode in

TABLE VI(a)

LINE

| ADDRESS (1) | NAME (2) | Mapped Color (thru palette) (3) | Gouraud Shading Off (4) | Z Off (5) | Texture Mapping Off (6) | Perspective Texture Mapping Off (7) |
|---|---|---|---|---|---|---|
| 0x4000 | X | | | | | |
| 0x4004 | Y | | | | | |
| 0x4008 | R | | | | | |
| 0x400C | G | SKIP | | | | |
| 0x4010 | B | SKIP | | | | |
| 0x4014 | $\Delta$ MAIN | | | | | |
| 0x4018 | Y COUNT | | | | | |
| 0x4028 | $\Delta$ WIDTH OPP | | | | | |
| 0x402C | $\Delta$ R MAIN | | SKIP | | | |
| 0x4030 | $\Delta$ G MAIN | SKIP | SKIP | | | |
| 0x4034 | $\Delta$ B MAIN | SKIP | SKIP | | | |
| 0x4044 | Z | | | SKIP | | |
| 0x4048 | $\Delta$ Z MAIN | | | SKIP | | |
| 0x4050 | V | | | | SKIP | |
| 0x4054 | U | | | | SKIP | |
| 0x4058 | $\Delta$ V MAIN | | | | SKIP | |
| 0x405C | $\Delta$ U MAIN | | | | SKIP | |
| 0x4068 | $\Delta$ 2V MAIN | | | | SKIP | SKIP |
| 0x406C | $\Delta$ 2U MAIN | | | | SKIP | SKIP |

Table VI(a) includes the values needed to render lines: X, Y, R, G, B, $\alpha$ MAIN, Y COUNT, $\Delta$WIDTH OPP, $\Delta$R MAIN, $\Delta$G MAIN, $\Delta$B MAIN, Z, $\Delta$Z MAIN, V, U, $\Delta$V MAIN, $\Delta$U MAIN, $\Delta$2V MAIN, and $\Delta$2U MAIN. The addresses in column 1 for these values are the same as in Table I with $\Delta$2V MAIN corresponding to address 0x4068 and $\Delta$2U MAIN corresponding to 0x406C. Columns 3-7 indicate the values that are skipped for five different situations. The mapped color mode, Z off, and texture mapping off conditions are the same modes as described above, but additional column 4, which is described in Table VI(b) as interpolating color across a polygon, is turned off through bit 12 of the Instruction Modifier field of the operational code instruction (Table IV), the color values $\Delta$R MAIN, $\Delta$G MAIN, and $\Delta$B MAIN may be skipped. Finally, if perspective texture mapping is turned off (column 7) which is effectuated by writing a "1" value to bits 16 and 17 of the Instruction Modifier field, the $\Delta$2V and $\Delta$2U MAIN values can be skipped.

TABLE VI(b)

| NAME | DESCRIPTION | LINE PARAMETERS SKIPPED | SKIP PARAMETERS WHEN: |
|---|---|---|---|
| Mapped or direct color | Mapped color modes use a Color Lookup Table in the palette to determine displayed color (e.g., 8 bit, 256 color palette mode). Direct modes send portions of the pixel directly to the Digital to Analog converters for display | Green and blue | Device is in 8 bits per pixel mapped palette mode and only the red component of color is used. |
| Gouraud | R, G, and B values are interpolated across line | Mains and orthos for color | Gouraud bit 12 in Instruction Modifier is turned off |
| Z | Z buffer functions on or off | Z values | Z function is turned off |
| Texture Mode | Determines whether linear or perspective texture mapping or neither is used | Various texture mapping parameters | See Table VII(b) below |

The mapped/direct color and Z conditions in Table VI(B) are substantially the same as that described in Table V(B). The Gouraud mode referred to in Table VI(B) allows for interpolation of colors across a line as discussed above.

Finally, the texture mode entry refers to texture mapping and perspective texture mapping modes. Either one of these modes, both, or neither may be implemented.

TABLE VII(a)

| | | POLYGON | | | | | |
|---|---|---|---|---|---|---|---|
| ADDRESS (1) | NAME (2) | Mapped Color (thru palette) (3) | Gouraud Shading Off (4) | Z Off (5) | Initial Width Off (6) | Texture Mapping Off (7) | Perspective Texture Mapping Off (8) |
| 0 × 4000 | X | | | | | | |
| 0 × 4004 | Y | | | | | | |
| 0 × 4008 | R | | | | | | |
| 0 × 400C | G | SKIP | | | | | |
| 0 × 4010 | B | SKIP | | | | | |
| 0 × 4014 | Δ MAIN | | | | | | |
| 0 × 4018 | Y COUNT | | | | | | |
| 0 × 401C | WIDTH MAIN | | | | SKIP | | |
| 0 × 4020 | WIDTH OPP | | | | SKIP | | |
| 0 × 4024 | Δ WIDTH MAIN | | | | | | |
| 0 × 4028 | Δ WIDTH OPP | | | | | | |
| 0 × 402C | ΔR MAIN | | SKIP | | | | |
| 0 × 4030 | ΔG MAIN | SKIP | SKIP | | | | |
| 0 × 4034 | ΔB MAIN | SKIP | SKIP | | | | |
| 0 × 4038 | ΔR ORTHO | | SKIP | | | | |
| 0 × 403C | ΔG ORTHO | SKIP | SKIP | | | | |
| 0 × 4040 | ΔB ORTHO | SKIP | SKIP | | | | |
| 0 × 4044 | Z | | | SKIP | | | |
| 0 × 4048 | ΔZ MAIN | | | SKIP | | | |
| 0 × 404C | ΔZ ORTHO | | | SKIP | | | |
| 0 × 4050 | V | | | | | SKIP | |
| 0 × 4054 | U | | | | | SKIP | |
| 0 × 4058 | ΔV MAIN | | | | | SKIP | |
| 0 × 405C | ΔU MAIN | | | | | SKIP | |
| 0 × 4060 | ΔV ORTHO | | | | | SKIP | |
| 0 × 4064 | ΔU ORTHO | | | | | SKIP | |
| 0 × 4068 | Δ2V MAIN | | | | | SKIP | SKIP |
| 0 × 406C | Δ2U MAIN | | | | | SKIP | SKIP |
| 0 × 4070 | Δ2V ORTHO | | | | | SKIP | SKIP |
| 0 × 4074 | Δ2U ORTHO | | | | | SKIP | SKIP |
| 0 × 4078 | ΔV ORTHO ADD | | | | | SKIP | SKIP |
| 0 × 407C | ΔU ORTHO ADD | | | | | SKIP | SKIP |

Table VII(a) includes the values that can be skipped for various situations when rendering polygons. If the graphics processor 100 is in a mapped or direct color mode, the G, B, ΔG MAIN, ΔB MAIN, ΔG ORTHO, and ΔB ORTHO values in the display list can be skipped as shown in column 3 of Table VII(a). In column 4 the ΔR MAIN, ΔG MAIN, ΔB MAIN, ΔR ORTHO, ΔG ORTHO, and ΔB ORTHO values can be skipped if the graphics processor 100 has the Gouraud shading mode turned off. Further, if the Z mode is turned off, the Z, ΔZ MAIN, and ΔZ ORTHO values are skipped as shown in column 5. If initial width control is turned off, WIDTH MAIN and WIDTH OPP values can be skipped (column 6). Initial width control is only used for rendering polygons and can be effectuated through bit 24 of the Instruction Modifier field of the operational code instruction as shown in Table IV. Finally, if either the texture mapping or perspective texture mapping modes are turned off in columns 7 and 8, the Δ2V MAIN, Δ2U MAIN, Δ2V ORTHO, Δ2U ORTHO, AV ORTHO ADD, and AU ORTHO ADD values can be skipped. Additionally, if the texture mapping mode is turned off, the V, U, ΔV MAIN, ΔU MAIN, ΔV ORTHO, and ΔU ORTHO values may be omitted from the display list.

comparison, and texture mapping includes X, Y, R, G, B, Z, V, and U values. To render a point, however, with texture mapping turned off and without a Z depth value results in the host processor generating a display list including only X, Y, R, G, and B values, three values fewer than for the prior point. Moreover, the present invention advantageously allows primitives to be rendered using only a minimum set of values included in the display list.

Figure 3:
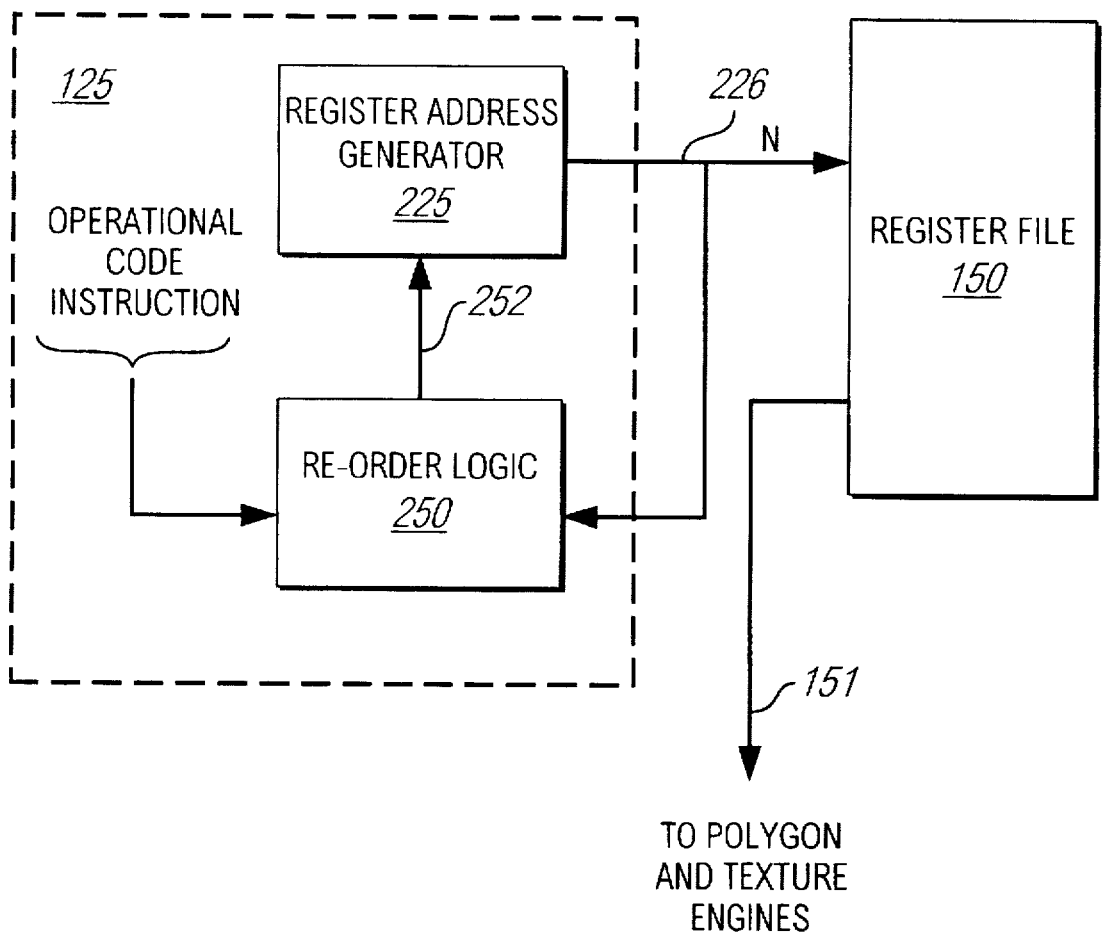
FIG. 3 is a block diagram depicting an exemplary embodiment for selecting only the values from the register file necessary for rendering the primitive to be drawn.

The following discussion addresses the manner in which a primitive is rendered with a display list that includes only the values necessary to render the primitive as described above. For purposes of this discussion it is assumed that the values for the rendering operation have previously been stored in the register file 150. Referring now to FIG. 3, the execution unit 125 is shown to comprise a register address generator 225 and re-order logic 250. As one of ordinary skill in the art would know, the execution unit may include other elements not shown in FIG. 3.

The register address generator 225 generates an address N pertaining to a register in the register file 150 and transmits the address N over signal line 226 to the register file. The data in the register at address N is then transmitted to the polygon and texture engines over signal line 151. Re-order TABLE VII(b)

POLYGON

| NAME | DESCRIPTION | PARAMETERS SKIPPED | SKIP PARAMETERS WHEN: |
|---|---|---|---|
| Mapped or direct color | Mapped color modes use a Color Lookup Table in the palette to determine displayed color (e.g., 8 bit, 256 color palette mode). Direct modes send portions of the pixel directly to the Digital to Analog converters for display | Green and blue | Device is in 8 bits per pixel mapped palette mode and only the red component of color is used. |
| Gouraud | R, G, and B values are interpolated across polygon | Mains and orthos for color | |
| Z | Z buffer functions on or off | Z values | Z function is turned off |
| Initial Width | Initial width control not used | Initial widths | |
| Texture Mode | Determines whether linear or perspective texture mapping or neither is used | Various texture mapping parameters | See Table IX(b) below |

Table VII(b) describes the conditions in which parameters can be omitted from display lists pertaining to polygons. The mapped or direct color mode was referred to in Tables V(b) and VI(b) as using a color look-up table to determine displayed color. The Gouraud mode provides for interpolation of colors across a polygon, while the Z depth function, if turned off, allows Z values to be skipped. Further, the initial width function determines whether an initial triangle width is provided in the display list. Finally, the texture mode entry refers to whether texture mapping and/or perspective texture mapping modes are used.

In summary, the host processor 50 generates a minimum display list 175 to render a primitive by omitting values from the display that are unnecessary for rendering the primitive during specific situations as described in the tables above and accompanying text. For example, a display list to render a point with all three color components, a Z depth value for logic 250 receives an operational code instruction which includes the opcode itself and the instruction modifier value. From the opcode and instruction modifier values, re-order logic 250 establishes which registers in the register file are necessary to render the primitive corresponding to the opcode double word and skips the unnecessary values as reflected above in Tables V–VII. Reorder logic 250 preferably contains a state machine that directs the register address generator 225 to increment its previous address N to an address corresponding to the next value in the register file 150 necessary to render the primitive. Specifically, the re-order logic 250 transmits an add-to-N value over signal line 252 to the register address generator 225. The add-to-N value specifies the number of registers in the register file that must be skipped to obtain the next needed register for rendering the primitive. Thus, the registers in the register file are re-ordered to transfer only the parameters from the register file to the polygon and texture engines that are necessary for rendering the primitive.

For example, if the opcode and instruction modifier indicate the primitive to be rendered is a polygon with no Z depth, the re-order logic 250 provides an add-to-N value of 4 to direct the register address generator to select every register in the register file 150 until register 0x4044. That register contains the Z value. Re-order logic 250 recognizes that the Z, ΔZ MAIN, and ΔZ ORTHO registers must be skipped as they are not needed to render the desired polygon. In response, re-order logic 250 provides an add-to-N value of 16 to the register address generator 225 to direct the register address generator to skip over the three Z related registers.

Numerous variations and modifications will become apparent to those skilled in the art once the above disclosure is fully appreciated. It is intended that the following claims be interpreted to embrace all such variations and modifications.

What is claimed is:

1. A method for generating a display list of values necessary for rendering a primitive from a set of all possible display list values, comprising the steps of:
   (a) placing into a display list an operational code instruction that includes an opcode which describes the type of drawing object comprising the primitive and an instruction modifier value; and
   (b) placing into the display list only the values needed to render the primitive defined by the opcode and wherein the number of values placed into the display list are less than the total number of display list values.

2. The method of claim 1, wherein the values necessary to render the primitive are ascertained from the opcode and the instruction modifier value.

3. The method of claim 2, wherein Z-related values are omitted from the display list if depth values are not required to render the primitive.

4. The method of claim 2, wherein values corresponding to a color are omitted from the display list if color is not required to the primitive.

5. The method of claim 2, further including the step of:
   (c) storing the display list in a system memory device.

6. The method of claim 1, wherein a host processor transmits the display list containing only the values needed to render the primitive to a graphics processor for rendering the primitive.

7. A method for receiving and storing a display list in a graphics processor wherein the display list only includes values necessary for rendering a primitive from a set of all possible display list values and further includes addresses associated with the included necessary values, comprising the steps of:
   (a) receiving the display list; and
   (b) storing said display list including only values necessary for rendering the primitive into a register file contained in the graphics processor, wherein said step of storing is capable of including less than all possible display list values and wherein each value from the display list is stored in a register corresponding to the register address associated with the value.

8. The method of claim 7, wherein the display list is received from a system memory device over a system bus.

9. The method of claim 7, wherein the display list received from the system bus was placed on the system bus from a host processor.

10. A method of rendering a primitive defined by an operational code instruction and a display list generated by a host processor, said operational code instruction including an opcode value and an instruction modifier value and said display list including only parameters necessary for rendering the primitive, said method including the steps of:
   (a) receiving the operational code instruction and display list and storing the operational code instruction and the display list in a register file, said register file including a plurality of registers for storing parameters associated with primitives;
   (b) decoding the opcode value and the instruction modifier value from the operational code instruction to determine the type of primitive to be rendered; and
   (c) re-ordering the plurality of registers in the register file to transfer only the parameters from the register that are necessary for rendering the primitive.

11. The method of claim 10, further comprising the step of:
   (d) giving the values selected from the register file to a graphics engine for rendering the primitive on a display.

12. The method of claim 10, wherein the display list stored in a transaction queue before being stored in said register file.

13. A system for rendering a primitive using a display list that contains only values necessary for rendering the primitive, comprising:
   a host processor for generating a display list of parameter values defining a primitive, wherein the display list of parameter values includes only values necessary for rendering the primitive and said host processor is capable of generating display list parameter values that includes less than all possible values that could be included in a display list;
   a system memory for storing said display list of parameter values;
   a graphics processor coupled to said host processor and said system memory by a system bus, wherein said graphics processor includes a register file storing said display list of parameter values; and
   a display coupled to the graphics processor for displaying the primitive;
   wherein the graphics processor processes primitive rendering operations using said display list that includes only the values necessary for rendering the primitive.

14. The system of claim 13, wherein the host processor generates the display list and stores said display list in said system memory.

15. The system of claim 14, wherein the host processor place into the display list only values necessary for rendering the primitive omitting all unnecessary values and stores in the display list a register address associated with each necessary value.

16. A system for rendering a primitive using a display list that contains only values necessary for rendering the primitive comprising:
   a host processor for generating a display list of parameter values defining a primitive, wherein the display list of parameter values includes only values necessary for rendering the primitive and omits all unnecessary values and stores in the display list a register address associated with each necessary value;
   a system memory for storing said display list of parameter values generated by said host processor;
   a graphics processor coupled to said host processor and said system memory by a system bus wherein the graphics processor includes a register file and processes primitive rendering operations by retrieving said display list from said system memory and storing each display list value in a register in the register file corresponding to said register address associated with each necessary value; and a display coupled to the graphics processor for displaying the primitive.

17. The system of claim 16, wherein the graphics processor includes an execution unit that reads and interprets an operational code instruction from the register file to skip values in the register file that are unnecessary for rendering the primitive.

18. The system of claim 17, wherein only the values necessary for rendering the primitive are written from the register file to polygon and texture engines included in the graphics processor.

19. The system of claim 17, wherein the execution unit includes re-order logic and a register address generator, and wherein the re-order logic receives the operational code instruction and directs the register address generator to skip the register file registers that are unnecessary for rendering the primitive.

* * * * *